United States Patent
Sutherland et al.

(10) Patent No.: US 10,938,150 B2
(45) Date of Patent: Mar. 2, 2021

(54) INTERPOSERS WITH ALIGNMENT GUIDES

(71) Applicant: Hewlett-Packard Development Company, L.P., Spring, TX (US)

(72) Inventors: Timothy J Sutherland, San Diego, CA (US); Markku Suomi, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/640,176

(22) PCT Filed: Aug. 29, 2017

(86) PCT No.: PCT/US2017/049152
§ 371 (c)(1),
(2) Date: Feb. 19, 2020

(87) PCT Pub. No.: WO2019/045693
PCT Pub. Date: Mar. 7, 2019

(65) Prior Publication Data
US 2020/0176928 A1    Jun. 4, 2020

(51) Int. Cl.
*H01R 13/62* (2006.01)
*H01R 13/631* (2006.01)
*H01R 31/06* (2006.01)
*H04M 1/725* (2021.01)

(52) U.S. Cl.
CPC ....... *H01R 13/6205* (2013.01); *H01R 13/631* (2013.01); *H01R 31/06* (2013.01); *H04M 1/72527* (2013.01)

(58) Field of Classification Search
None
See application file for complete search history.

(56) References Cited

U.S. PATENT DOCUMENTS

| 7,329,128 | B1 * | 2/2008 | Awad | H01R 13/6205 |
| | | | | 439/38 |
| 8,187,006 | B2 * | 5/2012 | Rudisill | H01R 11/30 |
| | | | | 439/39 |
| 8,512,048 | B2 * | 8/2013 | Yasuoka | H01R 13/73 |
| | | | | 439/39 |
| 9,197,010 | B2 * | 11/2015 | Greig | B64D 11/0624 |
| 9,778,705 | B2 * | 10/2017 | Esmaeili | G06F 1/1684 |
| 9,907,195 | B2 * | 2/2018 | Montazeri | H05K 5/0247 |

(Continued)

FOREIGN PATENT DOCUMENTS

| CN | 104577488 | 4/2015 |
| CN | 20160034578 | 3/2016 |

(Continued)

OTHER PUBLICATIONS

Zhong, J et al, "Multiband Slot Antennas for Metal Back cover Mobile Handsets", 2013.

*Primary Examiner* — Oscar C Jimenez
(74) *Attorney, Agent, or Firm* — Brooks, Cameron & Huebsch PLLC

(57) ABSTRACT

An interposer may include a plurality of magnetic plates disposed in the interposer. The interposer may further include contact pins disposed on an exterior portion of the interposer and alignment guides disposed on the exterior portion of the interposer. In an example, the contact pins may provide a serial bus connection.

12 Claims, 4 Drawing Sheets

(56) References Cited

U.S. PATENT DOCUMENTS

| | | | |
|---|---|---|---|
| 9,941,627 B2* | 4/2018 | Esmaeili | H01R 11/30 |
| 10,101,770 B2* | 10/2018 | Schatz | G06F 1/1632 |
| 10,361,508 B2* | 7/2019 | Eslava | A61B 5/00 |
| 10,367,291 B2* | 7/2019 | Asai | H01R 13/501 |
| 2012/0178270 A1* | 7/2012 | McElroy | H01R 13/6205 |
| | | | 439/39 |
| 2013/0098788 A1 | 4/2013 | McCarville et al. | |
| 2015/0011099 A1 | 1/2015 | Kim et al. | |
| 2015/0364863 A1* | 12/2015 | Andrus | H01R 13/6205 |
| | | | 439/39 |
| 2016/0105047 A1 | 4/2016 | Cui | |
| 2016/0173667 A1 | 6/2016 | Torres et al. | |
| 2016/0282905 A1 | 9/2016 | Laine | |
| 2016/0294113 A1 | 10/2016 | Mehandjiysky | |
| 2016/0309010 A1 | 10/2016 | Carnevali | |
| 2017/0070001 A1 | 3/2017 | Degner | |
| 2017/0170678 A1 | 6/2017 | Uhm | |

FOREIGN PATENT DOCUMENTS

| | | |
|---|---|---|
| CN | 105932753 | 9/2016 |
| CN | 105959437 | 9/2016 |
| CN | 205724986 | 11/2016 |
| CN | 205882786 | 1/2017 |

* cited by examiner

INTERPOSERS WITH ALIGNMENT GUIDES

BACKGROUND

An interposer is an electrical interface routing between one socket or connection to another socket or connection. An interposer may allow a socket or connection to be rerouted from one, type of socket or connection to another type of socket or connection.

DETAILED DESCRIPTION

Figure 1:
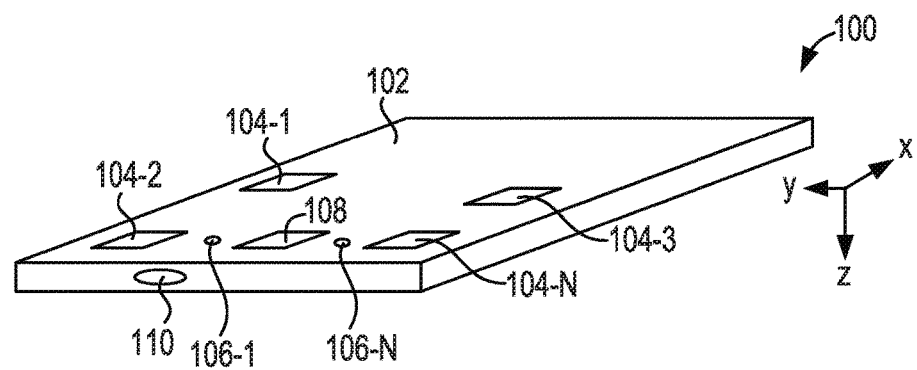
FIG. 1 illustrates an example of an interposer consistent with the disclosure.

An interposer is an electrical interface routing between one socket or connection to another socket or connection. An interposer may take the form of a housing (e.g., a case) that may couple to an electronic device such as a smartphone, tablet, phablet, personal digital assistant, or other similar electronic device.

An interposer may be disposed in a housing, which may allow for the addition of peripheral electronic devices to an electronic device. For example, the interposer disposed in the housing may allow for the electronic device to be coupled to peripheral devices such as cameras, speakers, projectors, bar code scanners, etc. However, in some approaches, such an interposer may be specific to the particular electronic device and/or peripheral device. As a result, when a user purchases a new electronic device, the new electronic device may not be able to interface (e.g., may not be supported) with the particular peripheral device in some approaches. This may lead to users purchasing new peripheral devices each time the upgrade their electronic device.

Examples herein are directed to interposers that allow for universal connectivity to various peripheral devices. This may allow for a user to retain their peripheral device(s) when upgrading their electronic device, which can reduce users' costs and improve users' experiences. In some examples, an interposer may be designed to couple to a particular electronic device. Once coupled to the electronic device, the interposer (and housing) may provide connectivity to additional interposers, docking stations (e.g., desk docks, car docks, etc.), gang chargers, and/or peripheral devices.

The figures herein follow a numbering convention, in which the first digit corresponds to the drawing figure number and the remaining digits identify an element or component in the drawing. For example, reference numeral 104 may refer to element "04" in FIG. 1 and an analogous element may be identified by reference numeral 204 in FIG. 2. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

FIG. 1 illustrates an example of an interposer 100 consistent with the disclosure. The view shown in FIG. 1 is a perspective view illustrating a back portion of the interposer 100. In the view illustrated in FIG. 1, an electronic device may be coupled to the bottom portion with the display of the electronic device facing in the z-direction. As shown in FIG. 1, the interposer 100 includes a housing 102, a plurality of attraction plates 104-1, . . . , 104-N, alignment guides 106-1, . . . , 106-N, contact 108, and contact 110.

The housing 102 may be formed as a result of an overmolding process; however, in some examples, the housing 102 may be formed by injection molding, 3-D printing, or other suitable fabrication process. The housing 102 may serve as a protective case for an electronic device.

Figure 2:
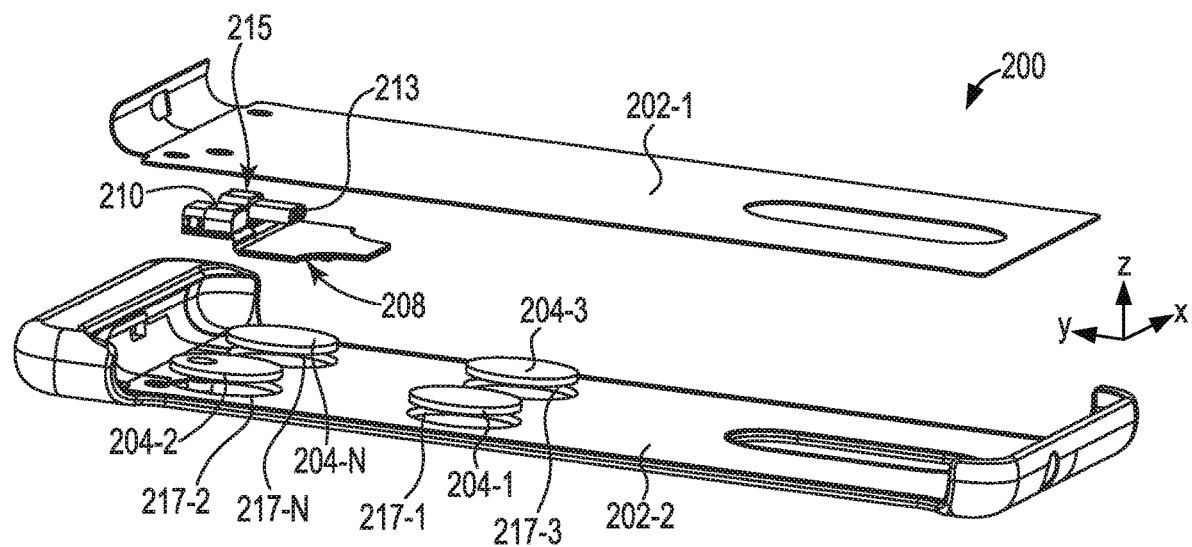
FIG. 2 illustrates an exploded view of the example interposer shown in FIG. 1.

As shown in more detail in connection with FIG. 2, the interposer 100 may include a plurality of attraction plates 104-1, . . . , 104-N. The attraction plates 104-1, . . . , 104-N may be ferromagnetic in order to shield internal components of the electronic device from magnetic effects. In some examples, nickel-iron soft magnetic alloys such as Mu-metal may be used to form the attraction plates 104-1, . . . , 104-N.

In some examples, the attraction plates 104-1, . . . , 104-N may facilitate coupling of the interposer 100 to a second interposer (as described in more detail in connection with FIGS. 5 and 6, herein), docking station, and/or peripheral device(s). For example, the attraction plates 104-1, . . . , 104-N may magnetically couple to magnets disposed in a second interposer docking station, and/or peripheral device.

The alignment guides 106-1, . . . , 106-N may be disposed on an exterior portion of the housing 102. The alignment guides 106-1, . . . , 106-N may define a cavity in the housing 102 for receipt of a guide pin or guide post to align the interposer 100 with a second interposer, docking station, and/or peripheral device. For example, the alignment guides 106-1, . . . , 106-N may allow for passive alignment of the interposer 100 with a second interposer, docking station, and/or peripheral device to which the interposer 100 is to be coupled to. In some examples, a first alignment guide 106-1 may be located between a first attraction plate 104-2 and contact 108, and the second alignment guide 106-N may be located between a second attraction plate 104-N and the contact 108.

In some examples, contact 108 and/or contact 110 may be serial connectors, such as universal serial bus (USB) connectors. For example, contact 110 may be a micro-USB connector and contact 108 may be a USB-C connector (e.g., an array of contact pins or pogos functioning, as a USB-C connector). In some examples, the contact 108 may include 18 pogos, which may be mated with a second interposer, docking station, and/or peripheral device to provide a through-USB-C connection form the interposer 100 to the second interposer, docking station, and/or peripheral device.

FIG. 2 illustrates an exploded view of the example interposer shown in FIG. 1. As shown in FIG. 2, the interposer 200 includes a housing 202-1, 202-2, a plurality of attraction plates 204-1, . . . , 204-N, and serial hub 215, which includes contact 208, contact 210, and contact 213. The housing 202-1, 202-2 may define a cavity to receive an electronic device such as a smartphone, tablet, phablet, etc.

Contact 208, contact 210, and/or contact 213 may be serial connectors, such as universal serial bus (USB) connectors. For example, contacts 210 and 213 may be micro-USB connectors and contact 208 may be a USB-C connector (e.g., an array of contact pins or pogos functioning as a USB-C connector). In some examples, the contact 208 may include 18 pogos, which may be mated with a second interposer, docking station, and/or peripheral device to provide a through-USB-C connection from the interposer 200 to the second interposer, docking station, and/or peripheral device.

Contact 213 may be disposed on an interior portion of the housing 202-1, 202-2, while contacts 210 and/or 213 may be disposed on exterior portions of the housing 202-1, 202-2. In some examples, contact 210 may be disposed on a first exterior portion of the housing 202-1, 202-2, and contact 213 may be disposed on a second exterior portion of the housing 202-1, 202-2. As shown in FIG. 2, the first exterior portion of the housing 202-1, 202-2 may be a portion of the housing that faces the x-direction, and the second exterior portion of the housing 202-1, 202-2 may be a portion of the housing 202-1, 202-2 that faces in the −z-direction.

Contact 213 may be a male USB connector that can couple to a female USB connector of an electronic device when the electronic device is coupled to (e.g., inserted into) the interposer 200. In some examples, the electronic device may be a smartphone, tablet, phablet, or other user electronic device. Contacts 208, 210, and/or 213 may send and/or receive signals from the user device. In some examples, contacts 208, 210, and/or 213 may allow for the electronic device to be coupled to, and send/receive signals from an external electronic device such as a second interposer, docking station, and/or peripheral device.

As shown in FIG. 2, a portion of the housing 202-2 may include recessed portions 217-1, . . . , 217-N that may be formed to receive the attraction plates 204-1, . . . , 204-N such that the attraction plates 204-1, . . . , 204-N are flush with a top surface of the portion of the housing 202-2. This may allow for the interposer 200 to have a substantially flat top surface when both portions of the housing 202-1, 202-2 are coupled together.

In some examples, the housing 202-1, 202-2 may have first lateral dimension that is between 101% and 115% larger than an electronic device that is coupled to the interposer 200 and/or the housing 202-1, 202-2 may have a second lateral dimension that is between 101% and 115% larger than the electronic device that is coupled to the interposer 200. For example, the housing 202-1, 202-2 may have lateral dimensions that are 15% or less larger than the electronic device that is coupled to the interposer 200. The first lateral dimension may extend along the x-direction as shown in FIG. 2, and the second lateral dimension may extend along the y-direction as shown in FIG. 2. In some examples, a third lateral dimension of the housing 202-1, 202-2 (e.g., a dimension extending in, the z-direction) may be less than 4 millimeters.

Figure 3:
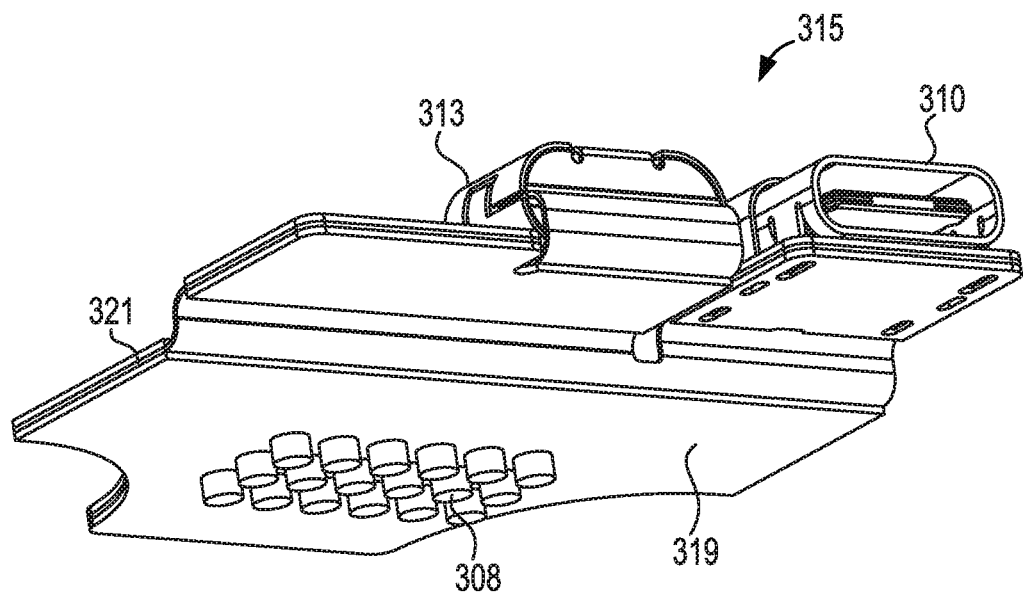
FIG. 3 illustrates an example of a serial hub consistent with the disclosure.

FIG. 3 illustrates an example of a serial hub 315 consistent with the disclosure. Contact 308, contact 310, and/or contact 313 may be serial connectors, such as universal serial bus (USB) connectors. For example, contacts 310 and 313 may be micro-USB connectors and contact 308 may be a USB-C connector (e.g., an array of contact pins or pogos functioning as a USB-connector). In some examples, the contact 308 may include a plurality of pogos.

In contrast to some approaches, the serial hub 315 illustrated in FIG. 3 may allow for duplication of the data path to and from contact 313. For example, data send and/or received by contact 313 may be duplicated to both contact 308 and contact 310. Examples are not so limited; however, and contacts 308 and 310 may send and receive data from different data sources (e.g., different peripheral devices, chargers, interposers, etc.) in addition to sending and receiving data via contact 313.

The serial hub 315 may be coupled to a circuit board 319. In some examples, the circuit board 319 may be a rigid flex circuit board. As used herein, a rigid flex circuit board is a circuit board that includes multiple flexible circuit inner layers selectively attached together using a bonding film. In some examples, a rigid flex circuit board may allow for the board to be incorporated externally, internally, or both. Examples are not so limited; however, and the circuit board 319 may be any type of printed circuit board (PCB) such as a single sided PCB, double sided PCB, multilayer PCB, rigid PCB, or flex PCB.

As shown in FIG. 3, the circuit board 319 may include a via 321. The via 321 may disposed along a perimeter of the circuit board 321. In some examples, the via 321 may connect a first portion of the circuit board 319 to a first ground location (e.g., a reference potential) and a second portion of the circuit board 319 to a second ground location (e.g., reference potential).

Figure 4:
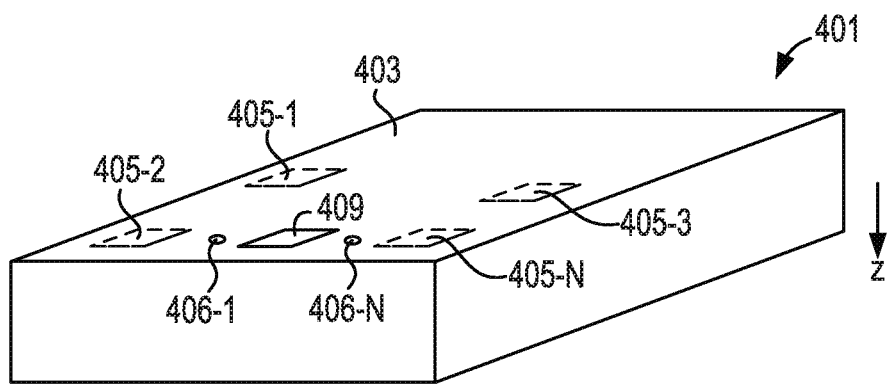
FIG. 4 illustrates another example of an interposer consistent with the disclosure.

FIG. 4 illustrates another example of an interposer 401 consistent with the disclosure. The interposer 401 includes a housing 403, a plurality of magnetic plates 405-1, . . . , 405-N, a plurality of alignment guides 406-1, . . . , 406-N, and contact pins 409. In some examples, the interposer 401 may function as an electronics sled. The interposer 401 may be coupleable to interposer 100, 200 illustrated in FIGS. 1 and 2, as described in more detail in connection with FIG. 6, herein.

For example, the contact pins 409 of interposer 401 may provide an electrical connection and/or serial bus connection between the interposer 401 and an electronic device or another interposer that is coupleable to the interposer 401. In some examples, the contact pins 409 may be operable as a USB-C connector and, when coupled to a connector on the electronic device or other interposer, the contact pins 409 may provide an electrical connection to the electronic device or other interposer that allows data to be transferred from a connector (e.g., contact 108, 208, 308 illustrated n FIGS. 1-3) of the other interposer.

The magnetic plates 405-1, . . . , 405-N of the interposer 401 may be disposed in the interposer 401 (e.g., on an interior portion of the interposer 401), while the alignment guides 406-1, . . . , 406-N and the contact pins 409 may be disposed on an exterior portion of the interposer 401.

Figure 5:
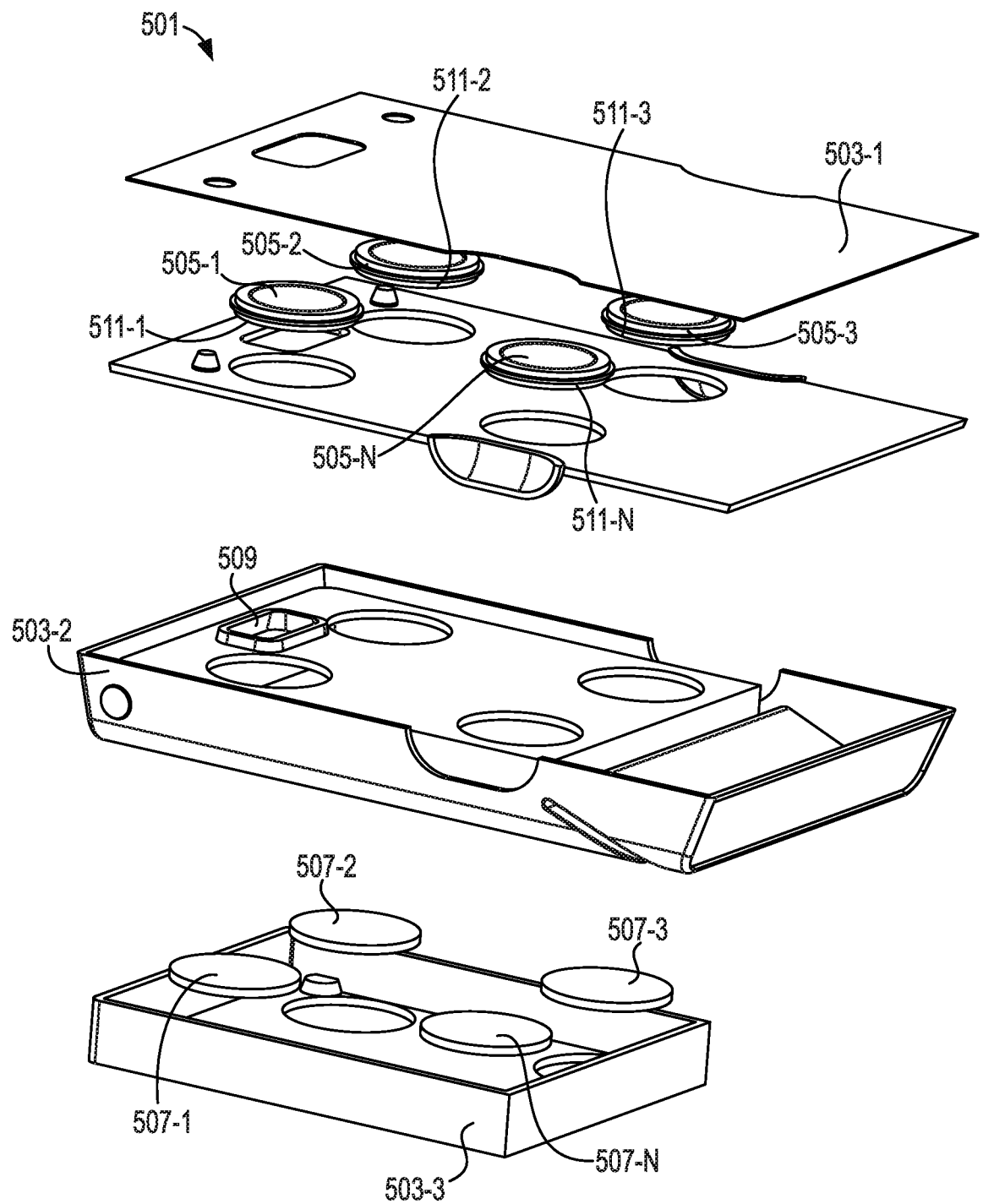
FIG. 5 illustrates an exploded view of another example of an interposer consistent with the disclosure.

FIG. 5 illustrates an exploded view of another example of an interposer consistent with the disclosure. As shown in FIG. 5, the interposer 501 may include a housing 503-1, 503-2, 503-3, a plurality of magnetic plates 505-1, . . . , 505-N, contact pins 509, and attraction plates 507-1, . . . , 507-N. The attraction plates 507-1, . . . , 507-N may be ferromagnetic in order to shield internal components of the electronic device from magnetic effects. In some examples, nickel-iron soft magnetic alloys such as Mu-metal may be used to form the attraction plates 507-1, . . . , 507-N.

In some examples, respective structures 511-1, . . . , 511-N may surround respective magnetic plates 505-1, . . . , 505-N among the plurality of magnetic plates 505-1 . . . , 505-N. The structures 511-1, . . . , 511-N may surround the magnetic plates 505-1, . . . , 505-N such that an individual portion of each magnetic plate 505-1, . . . , 505-N is exposed. For example, the structures 511-1, . . . , 511-N may surround the magnetic plates 505-1, . . . , 505-N such that a single side of the magnetic plate 505-1, . . . , 505-N is exposed. This may allow for a magnetic field generated by the magnetic plates 505-1, . . . , 505-N to be directed upward toward attraction plates of another interposer (e.g., attraction plates 204 of the interposer 200 illustrated in FIG. 2) to facilitate coupling of the interposer 501 to another interposer (e.g., interposer 100, 200 illustrated in FIGS. 1 and 2).

In some examples, the magnetic plates 505-1, . . . , 505-N and/or structures 511-1, . . . , 511-N may be formed from steel, 400 series stainless steel, neodymium, or alloys that are primarily comprised of nickel. In some examples, the magnetic plates 505-1, . . . , 505-N may be substantially cylindrical with a diameter on the order of 7/16 of an inch with a height on the order of 1/16 of an inch.

As shown in FIG. 5, the magnetic plates 505-1, . . . , 505-N and attraction plates 507-1, . . . , 507-N may be disposed on an exterior portion of the interposer 501, or may be disposed on interior portions of the interposer 501 such that the magnetic field generated by the magnetic plates 505-1, . . . , 505-N and/or the magnetic field received by the attraction plates 507-1, . . . , 507-N extends outside of the housing 503-1, . . . , 503-3 to facilitate coupling of the interposer 501 to another interposer (e.g., interposer 100, 200 illustrated in FIGS. 1 and 2), docking station, and/or peripheral device.

Figure 6:
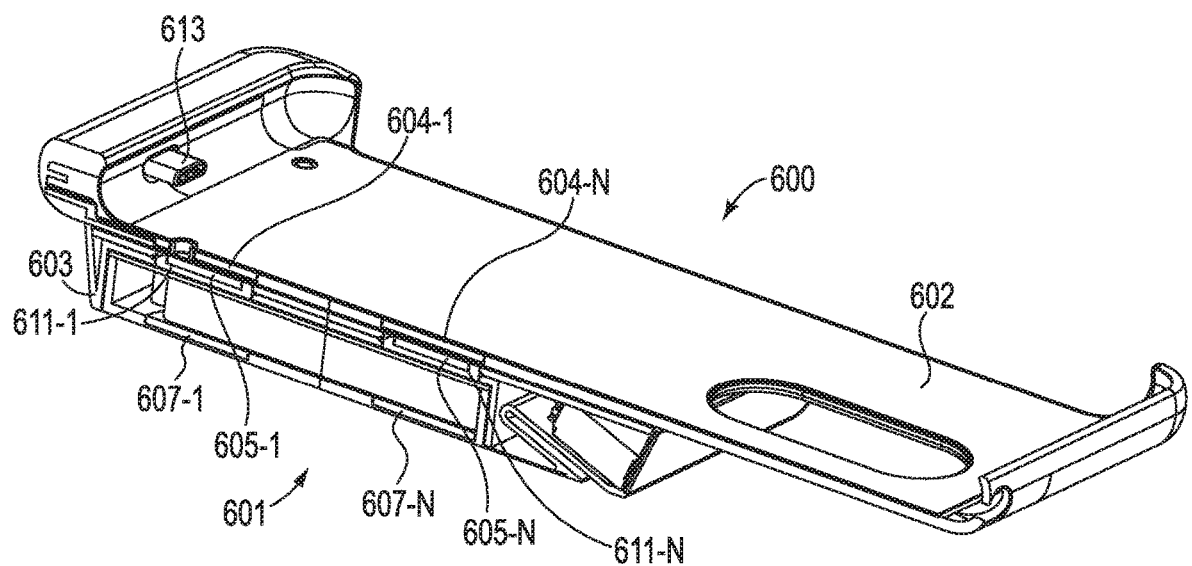
FIG. 6 illustrates an example of a first interposer coupled to a second interposer consistent with the disclosure.

FIG. 6 illustrates an example of a first interposer coupled to a second interposer consistent with the disclosure. As shown in FIG. 6, a first interposer 600 may include a housing 602, attraction plates 604-1, . . . , 604-N, and contact 613. Although not shown explicitly in FIG. 6, the interposer 600 may include a serial hub (e.g., 315 illustrated in FIG. 3), which may include a contact 310, second contact 613, and/or third contact 308. In addition, the interposer 600 may include alignment guides (e.g., alignment guides 106-1, . . . , 106-N illustrated in FIG. 1).

A second interposer 601 may include magnetic plates 605-1, . . . , 605-N, which may be surrounded by structures 611-1, . . . , 611-N as described in connection with FIG. 5. The second interposer 601 may further include attraction plates 607-1, . . . , 607-N. Although not shown in FIG. 6, the second interposer 601 may also include contact pins (e.g., contact pins 409 illustrated in FIG. 4) and alignment guides (e.g., alignment guides 406-1, . . . , 406-N illustrated in FIG. 4).

As described above, the alignment guides may provide passive alignment of the first interposer 600 and the second interposer 601 when the first interposer 600 and the second interposer 601 are magnetically coupled via the attraction plates 604-1, . . . , 604-N of the first interposer 600 and the magnetic plates 605-1, . . . , 605-N of the second interposer 601.

In some examples, at least one of the first contact (e.g., contact 310 illustrated in FIG. 3), the second contact 613, and the third contact (e.g., contact 308 illustrated in FIG. 3) of the first interposer 600 may be electrically coupled to the contact pins (e.g., contact pins 409 illustrated in FIG. 4) of the second interposer 601 when the first interposer 600 and the second interposer 601 are coupled. The coupling may be facilitated by having relative locations of the attraction plates 604-1, . . . , 604-N of the first interposer 600 that are substantially the same as the relative locations of the magnetic plates 605-1, . . . , 605-N of the second interposer 601.

The first interposer 600 and/or the second interposer 601 may include authentication circuitry (e.g., an authentication chip). For example, the first interposer 600 and/or the second interposer 601 may include circuitry to authenticate the first interposer 600 and/or the second interposer 601 when the first interposer 600 and the second interposer 601 are coupled together. In some examples, the authentication circuitry may provide authentication credentials from the first interposer 600 or the second interposer 601 to the other interposer.

The authentication circuitry may comprise an authentication chip, which may include circuitry (e.g., a microcontroller and/or logic circuitry) to authenticate the first interposer 600 and/or the second interposer 601 when the first interposer 600 and the second interposer 601 are coupled together. The authentication circuitry may be mechanically attached to the first interposer 600 and/or the second interposer 601 and may be activated when the first interposer 600 and the second interposer 601 are coupled together. In some examples, the authentication circuitry may be coupled to one of the contacts of the serial hub (e.g., contact 308 illustrated in FIG. 3) such that the authentication circuitry is enabled when contacts of the first interposer 600 are coupled to contacts of the second interposer 601.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect, to reference numerals in the drawings, indicate that a number of the particular feature so designated can be included. A "plurality of" is intended, to refer to more than one of such things.

What is claimed:

1. An interposer, comprising:
    a housing defining a cavity to receive an electronic device;
    a plurality of magnetic plates disposed in the housing of the interposer;
    a first connector positioned within the housing to couple to a serial hub of the electronic device;
    a second connector disposed on an exterior portion of the housing to duplicate communication with the serial hub of the electronic device;
    contact pins disposed on an exterior portion of the housing of the interposer to duplicate communication with the serial hub of the electronic device; and
    alignment guides disposed on the exterior portion of the housing of the interposer.

2. The interposer of claim 1, wherein the contact pins provide an electrical connection between the interposer and an electronic device coupleable to the interposer.

3. The interposer of claim 1, further comprising respective structures surrounding each magnetic plate among the plurality of magnetic plates, wherein each respective structure surrounds each respective magnetic plate such that an individual portion of each magnetic plate is exposed.

4. The interposer of claim 1, wherein the contact pins provide a serial bus connection.

5. The interposer of claim 1, further comprising a plurality of attraction plates disposed on an exterior portion of the interposer that is different than the exterior portion in which the plurality of magnetic plates and the plurality of contact pins are disposed.

6. An interposer, comprising:
    a housing defining a cavity to receive an electronic device;
    an attraction plate disposed in an interior portion of the housing;
    a first connector positioned within the housing to couple to a serial hub of the electronic device;

a second connector disposed on an exterior portion of the housing to duplicate communication with the serial hub of the electronic device;
contact pins disposed on an exterior portion of the housing of the interposer to duplicate communication with the serial hub of the electronic device; and
alignment guides disposed on an exterior portion of the housing.

7. The interposer of claim 6, wherein a first alignment guide is located between a first attraction plate and the contact pins, and a second alignment guide is located between a second attraction plate and the contact pins.

8. The interposer of claim 6, further comprising a rigid flex circuit board coupled to the serial hub, the rigid flex circuit board having a via disposed along a perimeter of the rigid flex circuit board, the via to connect a first portion of the rigid flex circuit board to a first ground location and a second portion of the rigid flex circuit board to a second ground location.

9. The interposer of claim 6, wherein the housing has a first lateral dimension that is between 101% and 115% larger than the electronic device that is insertable into the housing, and wherein the housing has a second lateral dimension that is between 101% and 115% larger than the electronic device.

10. A system, comprising:
a first interposer comprising:
attraction plates disposed in an interior portion of a housing of the first interposer;
a first connector positioned within the housing to couple to a serial hub of an electronic device;
a second connector disposed on an exterior portion of the housing to duplicate communication with the serial hub of the electronic device;
contact pins disposed on an exterior portion of the housing of the first interposer to duplicate communication with the serial hub of the electronic device; and
alignment guides disposed on an exterior portion of the first interposer; and
a second interposer comprising:
magnetic plates disposed in the second interposer;
contact pins disposed on an exterior portion of the second interposer; and
alignment guides disposed on the exterior portion of the second interposer, wherein the attraction plates of the first interposer are coupleable to the magnetic plates of the second interposer.

11. The system of claim 10, wherein the alignment guides of the first interposer and the alignment guides of the second interposer provide alignment of the first interposer and the second interposer when the first and second interposer are coupled.

12. The system of claim 10, wherein the relative locations of the attraction plates of the first interposer is substantially the same as the relative locations of the magnetic plates of the second interposer.

* * * * *